Feb. 8, 1955  G. CHAPIN  2,701,699
WATER POT CHRISTMAS TREE HOLDER
Filed March 31, 1954

INVENTOR.
Glen Chapin
BY Victor J. Evans & Co.
ATTORNEYS

United States Patent Office 2,701,699
Patented Feb. 8, 1955

2,701,699
WATER POT CHRISTMAS TREE HOLDER
Glen Chapin, Lakewood, Colo.

Application March 31, 1954, Serial No. 419,997

1 Claim. (Cl. 248—44)

This invention relates to Christmas tree holders of the type having a flat base adapted to be positioned on the floor with a water retaining cavity therein and with means integral with the base for supporting a tree in an upright position therein, and in particular an enlarged cup-shaped base having an outer wall with radially disposed ribs extended upwardly above the outer wall, with wedges for clamping the tree between inner ends of the ribs whereby lower branches of the tree positioned between the ribs may extend to the lower end of the trunk with the trunk in the water, and the holder is also provided with a centrally disposed prong positioned to extend upwardly into the lower end of the trunk of the tree with the trunk wedged between inner ends of the ribs.

The purpose of this invention is to provide a tree holder that is adapted to support a tree in which branches may extend to the lower end of the trunk of the tree with the lower end of the tree in water in the holder and with the tree wedged between parts of the holder and wherein the tree is positioned in a holder by a centrally positioned prong extended upwardly from the base of the holder.

Various types of gripping and clamping devices have been provided for independently supporting Christmas trees and the like, however, with such devices it is difficult to use a pan for holding water with branches of the tree extending to the lower end of the trunk. With this thought in mind this invention contemplates a base having an upwardly disposed rim with radially disposed ribs extended upwardly from the base and rim and extended inwardly from the rim whereby the trunk of a tree positioned on the center of the base is adapted to be clamped by wedges positioned between the inner ends of the ribs with branches extended from the outer surface of the trunk of the tree positioned between the ribs.

The object of this invention is, therefore, to provide a combination tree holder in which the trunk of a tree is rigidly clamped and in which the holder is adapted to contain water for supplying moisture to the tree.

Another object of the invention is to provide a tree holder which supports a tree with branches of the tree extended to the lower end of the trunk and with the lower end of the trunk in a well of water.

A further object of the invention is to provide an improved Christmas tree holder which provides water for the tree and which also clamps the lower end of the tree between rigid elements in which the device is of a simple and economical construction.

With these and other objects and advantages in view the invention embodies a flat base having a continuous peripheral wall extended upwardly therefrom with ribs radially positioned on the base and having inclined inner end surfaces, with wedges adapted to be positioned between the inner end surfaces of the ribs and a tree positioned on the base, and with a brad embedded in the base and extended upwardly so that it will extend into the lower end of the trunk of a tree positioned on the base.

Other features and advantages of the invention will appear from the following description taken in connection with the drawing, wherein.

Figure 1:
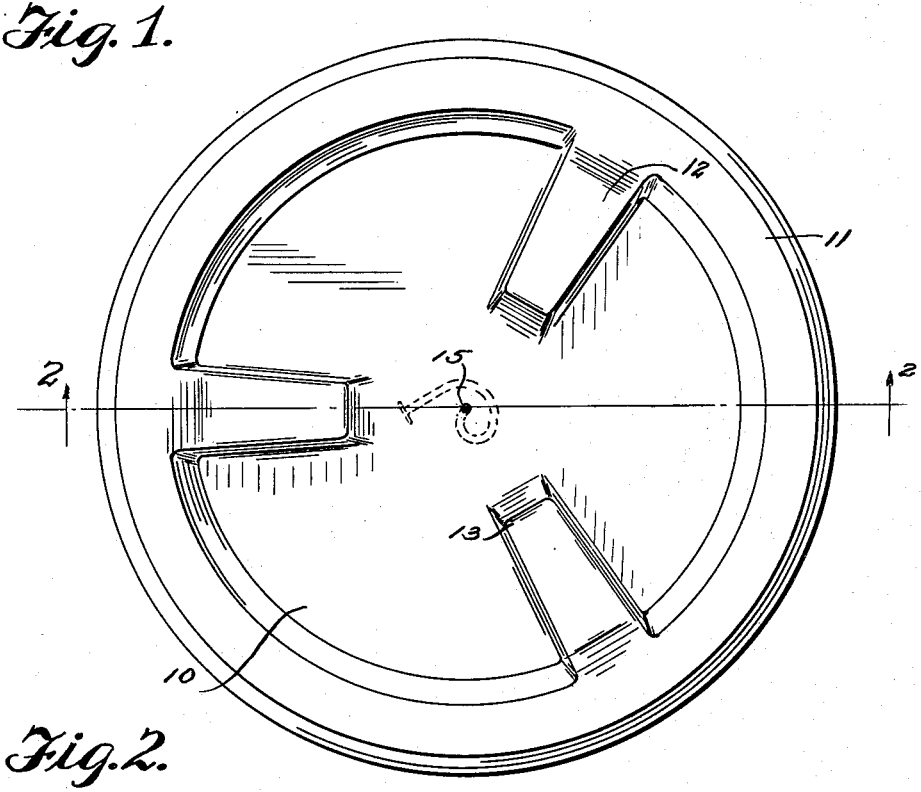
Figure 1 is a plan view of the improved water pot Christmas tree stand.

Referring now to the drawing wherein like reference characters denote corresponding parts the improved water pot Christmas tree stand of this invention includes a disc providing a base 10 with a continuous vertically disposed peripheral wall 11 extended upwardly from the edge, with radially disposed ribs 12 having inclined inner end surfaces 13, with a brad or prong 14 embedded in the base 10 and having a point 15 extended upwardly therefrom, and with a plurality of wedges, as indicated by the numeral 16.

Figure 2:
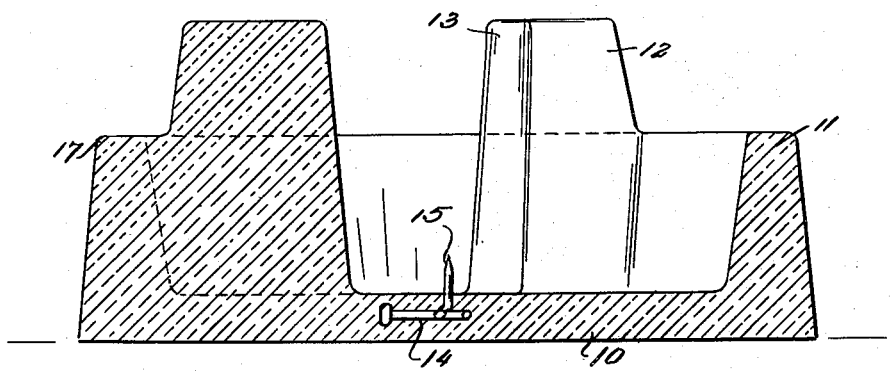
Figure 2 is a cross section through the stand taken on line 2—2 of Figure 1.
Figure 3:
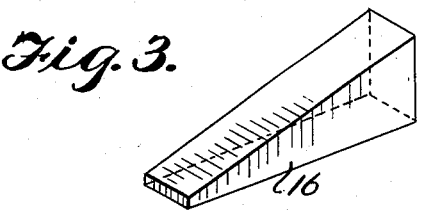
Figure 3 is a detail illustrating a wedge adapted to be used in combination with the stand.

As illustrated in Figure 2 the radially disposed web or ribs 12 are integral with the wall 11 and base 10 and the upper ends of the ribs extend upwardly above the upper edge 17 of the wall providing extended sections that facilitate gripping the trunk of a tree.

As illustrated in the drawing the brad 14 is formed with an arcuate section that is embedded in the material of the base 10 and the point 15, which is positioned in the center of the base extends upwardly from the arcuate section providing a prong or point upon which the lower end of the trunk of a tree is positioned.

With the parts formed in this manner the lower end of the trunk of a tree is inserted between the inner ends of the ribs 12 with the trunk centered on the point 15 whereby the trunk is pressed downwardly over the point and, with the tree is position, the wedges 16 are inserted in the spaces between the inner end surfaces of the ribs and the surface of the trunk of the tree whereby the trunk of the tree may be adjusted to a vertical position and clamped in the holder or stand by driving the wedges downwardly.

With the tree in position in the stand the open inner area may be filled or partly filled with water or other liquid to provide food for the tree.

It will be understood that modifications, within the scope of the appended claim, may be made in the design and arrangement of the parts without departing from the spirit of the invention.

It will also be understood that the stand or holder may be formed or plastic, concrete, metal, glass, pottery or other suitable material.

With this tree holder it is not necessary to remove the lower branches of a tree, as the lower end of the trunk may extend into the water of the holder with the low branches positioned between the ribs and with the outer wall lower than the ribs the low branches may extend over the upper edge of the wall.

There are other tree holders on the market today which feature a water cavity. Other holders feature a method of mounting a tree with extremely low limbs. The attached photograph clearly illustrates how the water pot tree holder combines these two features.

What is claimed is:

In a tree holder, a base having a continuous vertically disposed wall extended upwardly from a peripheral edge of the base and providing a water retaining basin, the inner surface of said wall being tapered so that the wall is of greater thickness at its lower end than it is at its upper end, a plurality of radially disposed ribs formed integral with said base and wall, said ribs their outer edges spaced inwardly from the outer surface of said wall, the top of said ribs being flat and lying in the same plane, said ribs having inclined inner surfaces spaced from each other providing a well for receiving the trunk of a tree, wedges positioned between the inner end surfaces of the ribs and the outer surface of the trunk of the tree, and a brad including an arcuate section embedded in said base and having a vertically disposed point extended upwardly from the base, said point being positioned in the center of the base, the lower surface of said base being flat for engaging a floor surface.

References Cited in the file of this patent

UNITED STATES PATENTS

| 497,999 | Windus | May 23, 1893 |
| 1,598,016 | Runser | Aug. 31, 1926 |
| 1,750,367 | Smith | Mar. 11, 1930 |
| 2,545,320 | Tilson et al. | Mar. 13, 1951 |

FOREIGN PATENTS

| 13,265 | Great Britain | June 2, 1911 |